United States Patent [19]

Mitchell et al.

[11] Patent Number: 5,065,428
[45] Date of Patent: Nov. 12, 1991

[54] SECURE MODE ANSWERING MACHINE

[75] Inventors: Michael L. Mitchell, Abilene; George Hawkins, Austin, both of Tex.

[73] Assignee: Motorola, Inc., Schaumburg, Ill.

[21] Appl. No.: 529,800

[22] Filed: May 29, 1990

[51] Int. Cl.[5] .............................................. H04K 1/00
[52] U.S. Cl. ...................................... 380/23; 380/50; 379/88; 379/89
[58] Field of Search .................. 380/9, 23, 50; 379/95, 379/77, 88, 89, 90, 67

[56] References Cited

U.S. PATENT DOCUMENTS

| | | | |
|---|---|---|---|
| 4,626,623 | 12/1986 | La Haye | 379/95 |
| 4,881,263 | 11/1989 | Herbison et al. | 380/23 |
| 4,888,802 | 12/1989 | Cooney | 380/23 |
| 4,937,861 | 6/1990 | Cummins | 380/50 |

Primary Examiner—Thomas H. Tarcza
Assistant Examiner—Tod Swann
Attorney, Agent, or Firm—Frank J. Bogacz; Jordan C. Powell

[57] ABSTRACT

A secure answering machine allows both secure and non-secure information to be recorded by incorporating a digital signal processor (DSP) and both a secure and non-secure RAM. The secure RAM is powered entirely by battery. The battery is then connected to the housing of the answering machine such that when the housing is tampered with, the power from the battery is shut off eliminating all information stored on the secure RAM. The secure RAM is only accessed using an encrypting code.

11 Claims, 1 Drawing Sheet

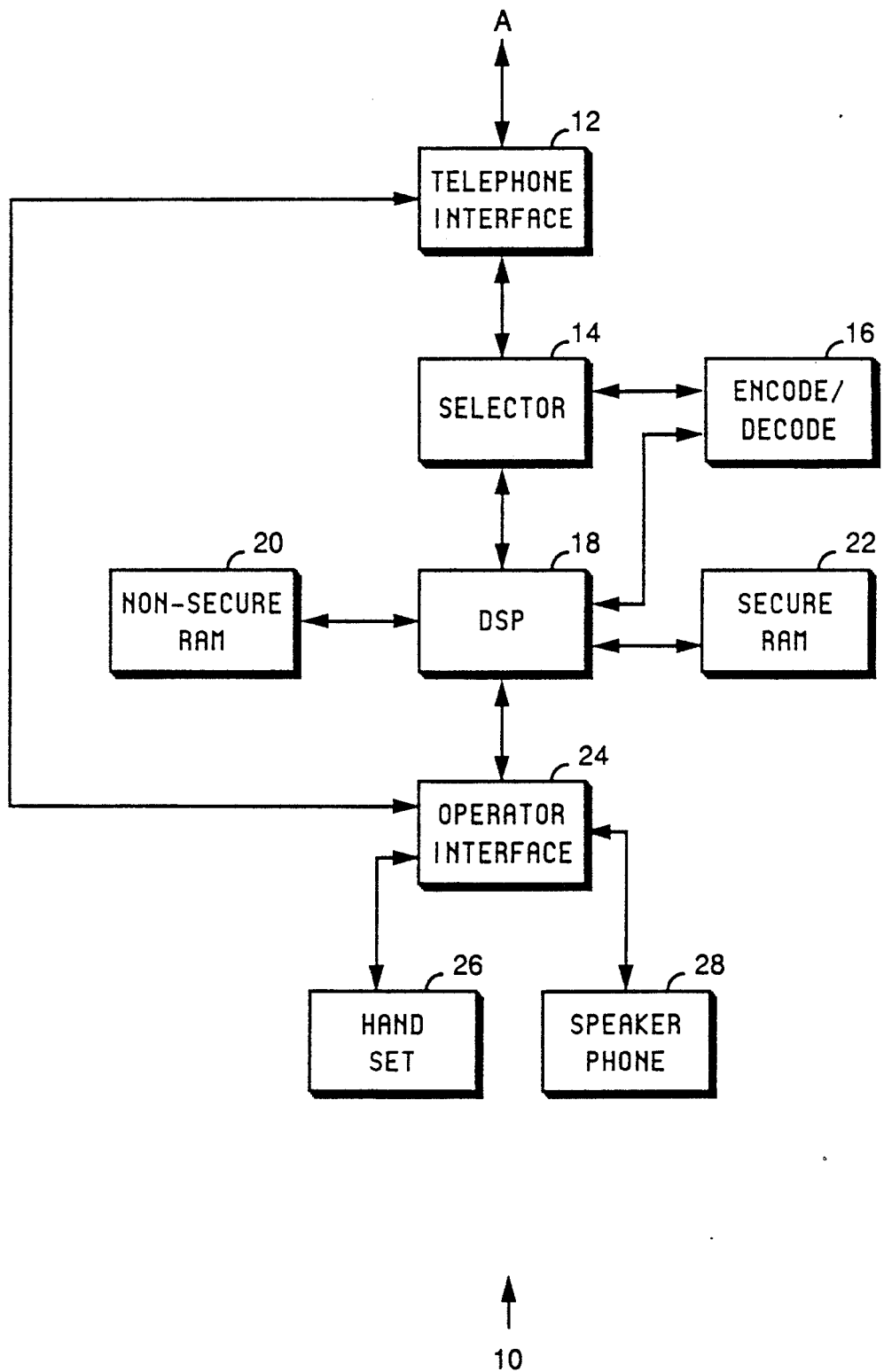

SECURE MODE ANSWERING MACHINE

BACKGROUND OF THE INVENTION

This invention relates, in general, to telephone answering machines, and more specifically, to secure voice answering machines.

Throughout the ages, secrecy of information has been important to governments and businesses. Governments attempt to maintain certain information as secret in order to gain advantages over other governments, or to maintain some element of national security. Businesses attempt to keep information secret in order to maintain a competitive advantage over rivals. Private individuals also seek to maintain secrecy over their personal lives.

As telecommunications have advanced, so have new ways of transferring information. Information is transferred at higher rates, in clearer signals, and at farther distances. Not only have ways to transmit information to a receiving party been developed at a tremendous pace, but ways of intercepting the information have been developed and are continually being perfected. information, sensitive or not, communicated through public access systems can be easily intercepted.

To keep the integrity of sensitive information from being compromised, secure voice telecommunication systems are available to both government and business entities. These secure voice telecommunication systems utilize code management schemes to ensure that only those telecommunication systems having access to the same code may communicate together. More advanced secured telephones use key management systems which change the access code with each telephone conversation.

When secured telephones were initially introduced, users had only the basic communication tie between stations. Options such as call waiting, forwarding, conferences, and so forth, were unavailable. Manufacturers of secure telephones have rapidly been incorporating such options/ features to increase the marketability of their products to customers familiar with such features. The present invention discloses one such option-a secured answering machine.

SUMMARY OF THE INVENTION

It is an object of the present invention to provide a secure answering machine for use with secure telecommunication equipment.

A secure answering machine allows both secure and non-secure information to be recorded by incorporating a digital signal processor (DSP) and both a secure and non-secure RAM. The secure RAM is powered entirely by battery. The battery is then connected to the housing of the answering machine such that when the housing is tampered with, the power from the battery is shut off eliminating all information stored on the secure RAM. The secure RAM is only accessed using an encrypting code.

The above and other objects, features, and advantages of the present invention will be better understood from the following detailed description taken in conjunction with the accompanying drawings.

BRIEF DESCRIPTION OF THE DRAWING

The FIGURE is a block diagram of a secure answering machine for use will secure telecommunications according to the present invention.

DETAILED DESCRIPTION OF THE INVENTION

To increase the convenience of using secured telephones, many opitons/features are incorporated within the secure telephones. These features are those which most customers of secure telephones are familiar with from their use of unsecured phones. The present invention discloses one such feature, the answering machine, which is widely used by non-secure telephone users but unavailable with secure capabilities. The secured answering machine must be able to transmit and receive secure messages, as well as transmit and receive non-secure, or clear voice, messages.

The FIGURE shows a block diagram of secure answering machine 10 in its preferred embodiment. Secure answering machine 10 is coupled to a telecommunication access line at A.

Secure answering machine 10 comprises telephone interface 12, selector 14, encode/decode 16, digital signal processor (DSP) 18, non-secure RAM 20, secure RAM 22, and an operator interface device 24 having a hand-set 26 and a speaker phone 28. One should readily recognize that secure answering machine 10 is both an answering machine and a telephone set in one. However, secure answering machine 10 could be limited to only an answering machine without the convenience of a telephone set attached. In such a circumstance, operator interface 24 would be replaced with a speaker which allows one to record messages to answering machine 10 and play-back messages left on answering machine 10. The connection between operator interface 24 and telephone interface 12 would not be a part of answering machine 10 where the telephone set is not incorporated.

Telephone interface 12 converts signals received at "A" into digital signals. The digital signals from interface 12 are then received by selector 14 which determines if the incoming signal is secure or not. If the incoming signal is secure, the signal is relayed to encode/decode 16 for decoding. The decoded message is then relayed to DSP 18. If the incoming signal is not secure, selector 14 will relay the signal directly to DSP 18. DSP 18 will write the incoming message to non-secure RAM 20 if the signal is non-secure. When the signal is secure, DSP 18 will write the signal to secure RAM 22.

DSP 18 is coupled to operator interface 24 to allow an operator to leave an introductory message on non-secure RAM 20 for non-secure messages, or on secure RAM 22 for secure messages. The coupling of operator interface 24 also allows an operator to access the secure messages in secure RAM 22. Operator interface 24 is further coupled directly to telephone interface 12 to allow direct outside operator communication without passing through the answering machine devices. When coupled directly to telephone interface 12, secure communication is facilitated by manually selecting secure voice with a device not shown and not part of the present invention. Such a device is understood to be a conventional element within operator interface 24.

Messages left on secure RAM 22 are accessible through the secure mode of operator interface 24. Access to messages left on non-secure RAM 20 is through normal answering machine methods such as pressing a button and having the answering machine play back the message. If answering machine 10 does not incorporate operator interface 24, as mentioned above, a secure access device would be incorporated allowing accesss to secure RAM 22.

Secure RAM 22 and non-secure RAM 20 are battery operated. Secure answering machine 10 is then constructed so that if there is any tampering with the machine, the power from the battery is cut off. When the power is discontinued, the messages on RAMs 20 and 22 are lost entirely.

According to the preferred embodiment, when a call is received by secure answering machine 10, DSP 18 retrieves a non-secure (clear) outgoing message from non-secure RAM 20 which is transmitted to the caller. The caller is given, through the clear message, the option to go secure. If the caller chooses non-secure, the message will be left on non-secure RAM 20 as selected by selector 14. If the caller chooses secure, DSP 18 will retrieve a secure message, as directed by selector 14, from secure RAM 22. The secure message is encoded by encode/decode 16 and transmitted to the caller. The secure message lets the caller know that answering machine 10 is in secure mode. The pursuing message, as received from the caller, is then decoded by encode/decode 16 and stored in secure RAM 22. Subsequent access to the secure mode is through operator interface 24 when operator interface 24 is in secure mode. DSP 18 will only allow operator interface 24 access to secure RAM 22 when operator interface 24 is in secure mode.

By supplying an answering machine which may operate in a secure mode, use of secure telecommunication equipment is further facilitated. Users of secure equipment can now use equipment similar to that which they have become accustomed to with clear telecommunications.

Thus there has been provided, in accordance with the present invention, a secure answering machine that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

We claim:

1. A device for receiving and storing information, such as telecommunication messages or transmitted data, for subsequent play-back, the device also transmitting information, such as telecommunication messages or transmitted data, the device comprising:
   first means for receiving incoming information and transmitting information;
   second means for determining when the information received or transmitted is secure or unsecured, said second means coupled to said first means;
   third means coupled to said second means;
   said third means for processing information received into and transmitted from the device;
   an encoder/decoder coupled to said second and third means, said encoder/decoder receiving information which is secure and decoding the information when the device is receiving information, and encoding the information when the device is transmitting information;
   said second means relaying received information to said encoder/decoder when said received information is secure, and receiving information from said encoder/decoder when information to be transmitted is secure;
   said third means receiving information from said encoder/decoder when said information is secure, and relaying secure information to said encoder/decoder;
   a plurality of RAMs (random access memory) coupled to said third means;
   a first of said plurality of RAMs storing unsecured messages received from said third means and relaying unsecured messages to said third means;
   a second of said plurality of RAMs storing secure messages received from said third means and relaying secure messages to said third means;
   means for receiving said messages stored in said first and second RAMs; and
   said means for receiving said messages coupled to said first and second RAMs.

2. A device according to claim 1 wherein said means for receiving said messages comprises:
   an operator interface coupled to said first and third means;
   said operator interface allowing an operator to communicate directly with said third means or directly with said first means;
   said direct communication between said operator interface and said third means allowing an operator to record information to and receive messages from said plurality of RAMs; and
   said direct communication between said operator interface and said first means allowing an operator to communicate an external operator or external device without accessing said third and second means.

3. A device according to claim 1 wherein said third means comprises a digital signal processor (DSP).

4. A device according to claim 1 wherein said second RAM is battery powered.

5. A device according to claim 4 wherein the device further comprises:
   housing for the device;
   battery for supplying power to said second RAM; and
   said battery connected to said housing such that when tampering with said housing occurs, said battery no longer supplies power to said second RAM and the information stored on said second RAM is destroyed.

6. A device according to claim 1 wherein the device further comprises:
   tamper-proof means coupled to said second RAM; and
   said tamper-proof means for eliminating any information stored within said second RAM when the device is tampered with.

7. A device according to claim 6 wherein said tamper-proof means comprises:
   battery coupled to said second RAM;
   said battery completely powering said second RAM; and
   said battery removing power to said second RAM when the device is tampered with.

8. A device according to claim 1 wherein the device further comprises:
   tamper-proof means coupled to said third means; and
   said tamper-proof means for eliminating any information stored within said third means when the device is tampered with.

9. A device according to claim 8 wherein said tamper-proof means comprises:
- a battery source for supplying power to said third means; and
- said power is removed when the device is tampered with.

10. A device for receiving and storing information, such as telecommunication messages or transmitted data, for subsequent play-back after the information has been received, the device also transmitting information, such as telecommunication messages or transmitted data, the device comprising:
- first means for communicating with an external source;
- second means for control the flow of information through the device, said second means separating secure information from non-secure information;
- third means for storing secure and un-secure information in separate, distinct locations, including one secure and one unsecure;
- said second means coupled to said first means, said second means including a digital signal processor for processing incoming and outgoing information;
- said second means further including:
  - select means for determining when incoming information or outgoing information is secure or unsecured, said select means coupled to said first means;
  - an encoder/decoder coupled to said select means and said digital signal processor, said encoder/decoder decoding incoming information, and encoding outgoing information;
  - said digital signal processor coupled to said select means and to said third means;
  - said select means and said digital signal processor transferring unsecured information directly between each other;
  - said select means and said digital signal processor transferring secure information through said encode/decode; and
  - said digital signal processor transferring secure information to and from said secure location of said third means, and transferring unsecured information to and from said unsecured location of said third means;
- said first means linking the device with said external source; and
- said third means coupled to said second means.

11. A device according to claim 10 wherein said third means comprises:
- a plurality of RAMs (random access memory) coupled to said second means;
- a first of said plurality of RAMs storing and transferring unsecured information; and
- a second of said plurality of RAMs storing and transferring secure information.

* * * * *